US012602052B2

(12) United States Patent
Jeon et al.

(10) Patent No.: US 12,602,052 B2
(45) Date of Patent: Apr. 14, 2026

(54) METHOD AND APPARATUS WITH NAVIGATION PATH GENERATION

(71) Applicant: Electronics and Telecommunications Research Institute, Daejeon (KR)

(72) Inventors: Seohyun Jeon, Daejeon (KR); SeungHwan Park, Daejeon (KR); Jae-Yeong Lee, Daejeon (KR); Seung-Ik Lee, Daejeon (KR); Jae Ho Lim, Daejeon (KR); Seung Min Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 136 days.

(21) Appl. No.: 18/603,687

(22) Filed: Mar. 13, 2024

(65) Prior Publication Data

US 2024/0310846 A1 Sep. 19, 2024

(30) Foreign Application Priority Data

Mar. 13, 2023 (KR) ......................... 10-2023-0032642

(51) Int. Cl.
*G05D 1/229* (2024.01)
*G05D 1/246* (2024.01)

(52) U.S. Cl.
CPC ........... *G05D 1/229* (2024.01); *G05D 1/2464* (2024.01); *G05D 1/2469* (2024.01)

(58) Field of Classification Search
CPC .... G05D 1/229; G05D 1/2464; G05D 1/2469; G05D 1/242; G05D 1/644;
(Continued)

(56) References Cited

U.S. PATENT DOCUMENTS

2013/0123981 A1    5/2013 Lee et al.
2021/0041243 A1*   2/2021 Fay ...................... G05D 1/0248
(Continued)

FOREIGN PATENT DOCUMENTS

KR    10-2013-0065126 A    6/2013
KR       10-1427186 B1    8/2014
(Continued)

OTHER PUBLICATIONS

Liu et al.; Autonomous Exploration and Map Construction of a Mobile Robot Based on the TGHM Algorithm; Sensors 2020, 20, 490; www.mdpi.com/journal/sensors (Year: 2020).*

*Primary Examiner* — Michael J Zanelli
(74) *Attorney, Agent, or Firm* — NSIP Law

(57) ABSTRACT

A method and apparatus of generating a path for autonomous navigation of a mobile computing apparatus is provided. The mobile computing apparatus includes one or more processors configured to map a set global path, which connects a current position of the mobile computing apparatus with a future destination of the mobile computing apparatus based on a topology map, to a real-time generated occupancy grid map that represents, based on sensor data of a surrounding environment of the mobile computing apparatus, an un-drivable area and a drivable area in the surrounding environment, and generate a local path, for a traveling of the mobile computing apparatus, connecting the current position with a sub-waypoint that corresponds to the drivable area in response to a next waypoint, to which the mobile computing apparatus is set to travel based on the global path, being determined to correspond to the undrivable area.

20 Claims, 17 Drawing Sheets

WP1: WAYPOINT REPRESENTING CURRENT POSITION OF MOBILE ROBOT
WP2: WAYPOINT REPRESENTING DESTINATION OF MOBILE ROBOT

(58) Field of Classification Search
CPC ............ G05D 2107/17; G01C 21/3407; G01C
21/3807; G06T 7/70; G06T 7/13; G06T
3/18
See application file for complete search history.

(56) References Cited

U.S. PATENT DOCUMENTS

| | | | |
|---|---|---|---|
| 2021/0197377 A1* | 7/2021 | Gaschler | .............. G05D 1/0274 |
| 2022/0277555 A1 | 9/2022 | Lee et al. | |
| 2022/0390954 A1 | 12/2022 | Klingensmith | |

FOREIGN PATENT DOCUMENTS

| | | |
|---|---|---|
| KR | 10-2219843 B1 | 2/2021 |
| KR | 10-2021-0063791 A | 6/2021 |
| KR | 10-2023-0001949 A | 1/2023 |

* cited by examiner

FIG. 2

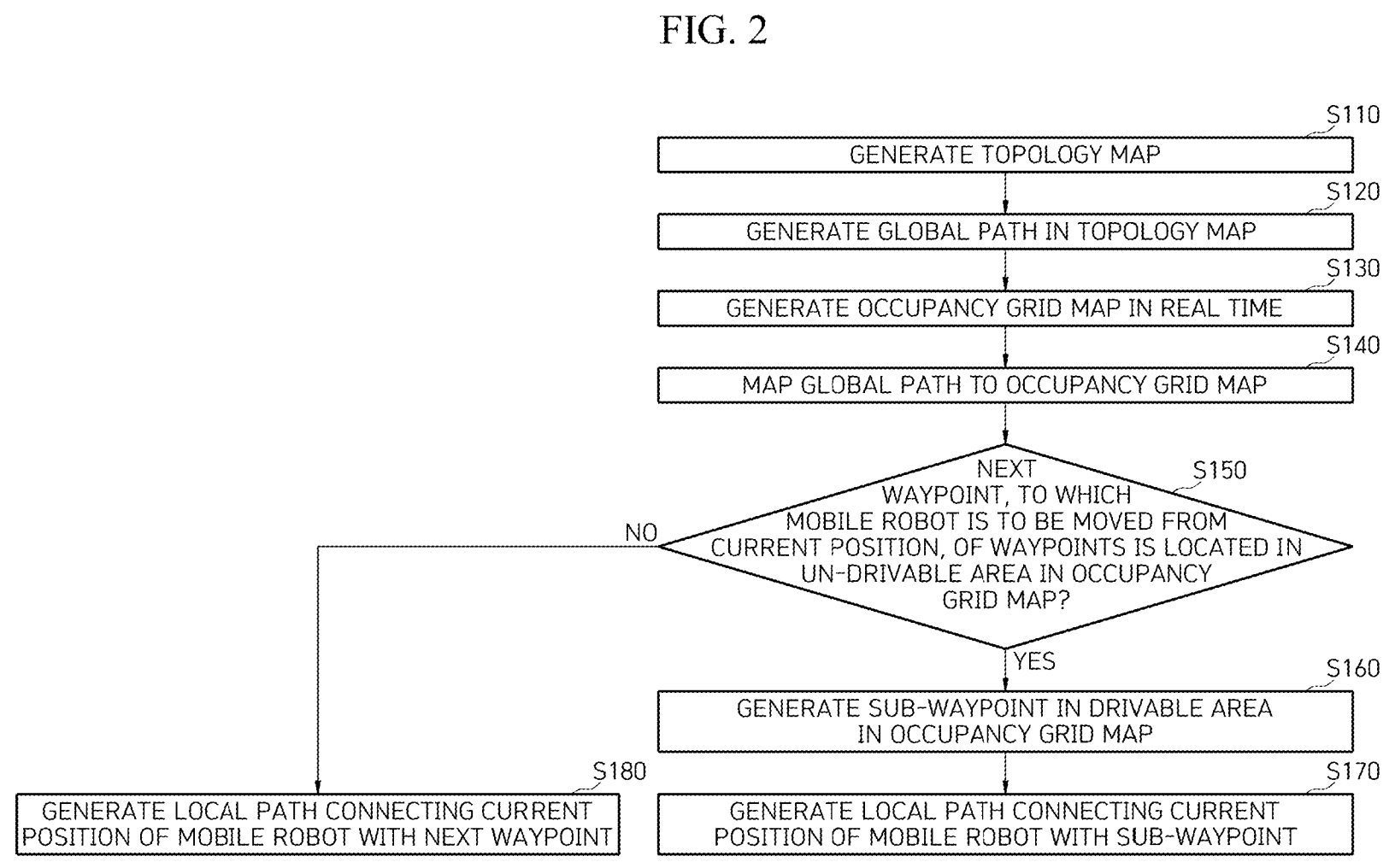

S110　GENERATE TOPOLOGY MAP

S120　GENERATE GLOBAL PATH IN TOPOLOGY MAP

S130　GENERATE OCCUPANCY GRID MAP IN REAL TIME

S140　MAP GLOBAL PATH TO OCCUPANCY GRID MAP

S150　NEXT WAYPOINT, TO WHICH MOBILE ROBOT IS TO BE MOVED FROM CURRENT POSITION, OF WAYPOINTS IS LOCATED IN UN-DRIVABLE AREA IN OCCUPANCY GRID MAP?

YES

S160　GENERATE SUB-WAYPOINT IN DRIVABLE AREA IN OCCUPANCY GRID MAP

S170　GENERATE LOCAL PATH CONNECTING CURRENT POSITION OF MOBILE ROBOT WITH SUB-WAYPOINT

NO

S180　GENERATE LOCAL PATH CONNECTING CURRENT POSITION OF MOBILE ROBOT WITH NEXT WAYPOINT

S111

DOWNLOAD SATELLITE MAP INFORMATION
FROM PORTAL WEBSITE

S113

GENERATE NODES AND EDGES CONNECTING NODES
WITH ONE ANOTHER IN SATELLITE MAP IMAGE
NCLUDED IN SATELLITE MAP INFORMATION

S115

GENERATE TOPOLOGY MAP INCLUDING NODES
AND EDGES FROM SATELLITE MAP IMAGE

S117

TRANSMIT GENERATED TOPOLOGY MAP
TO MOBILE ROBOT

40

S121
SELECT NODES, CONNECTING CURRENT POSITION OF
MOBILE ROBOT WITH DESTINATION, IN TOPOLOGY MAP

S123
SET SELECTED NODES TO WAYPOINTS

S125
GENERATE GLOBAL PATH INCLUDING SET WAYPOINTS
AND EDGES CONNECTING NODES WITH ONE ANOTHER

WP1: WAYPOINT REPRESENTING CURRENT
     POSITION OF MOBILE ROBOT
WP2: WAYPOINT REPRESENTING
     DESTINATION OF MOBILE ROBOT

WP1: WAYPOINT REPRESENTING CURRENT
       POSITION OF MOBILE ROBOT

WP2: WAYPOINT REPRESENTING
       DESTINATION OF MOBILE ROBOT

WP1: WAYPOINT REPRESENTING CURRENT
     POSITION OF MOBILE ROBOT
WP2: WAYPOINT REPRESENTING
     DESTINATION OF MOBILE ROBOT

WP1: WAYPOINT REPRESENTING CURRENT
      POSITION OF MOBILE ROBOT
WP2: WAYPOINT REPRESENTING
      DESTINATION OF MOBILE ROBOT

FIG. 13

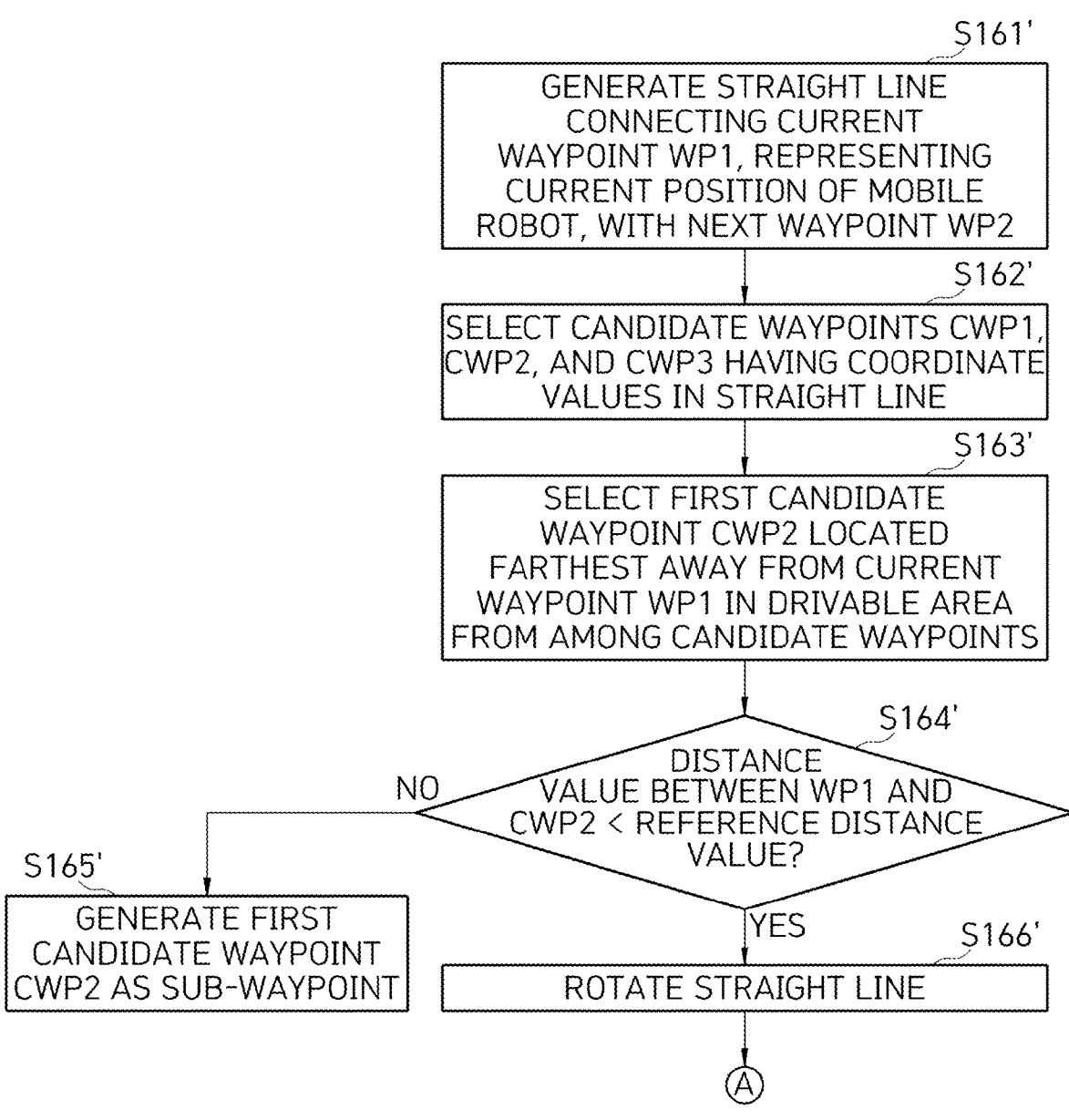

S161'

GENERATE STRAIGHT LINE CONNECTING CURRENT WAYPOINT WP1, REPRESENTING CURRENT POSITION OF MOBILE ROBOT, WITH NEXT WAYPOINT WP2

S162'

SELECT CANDIDATE WAYPOINTS CWP1, CWP2, AND CWP3 HAVING COORDINATE VALUES IN STRAIGHT LINE

S163'

SELECT FIRST CANDIDATE WAYPOINT CWP2 LOCATED FARTHEST AWAY FROM CURRENT WAYPOINT WP1 IN DRIVABLE AREA FROM AMONG CANDIDATE WAYPOINTS

S164'

DISTANCE VALUE BETWEEN WP1 AND CWP2 < REFERENCE DISTANCE VALUE?

NO

S165'

GENERATE FIRST CANDIDATE WAYPOINT CWP2 AS SUB-WAYPOINT

YES

S166'

ROTATE STRAIGHT LINE

Ⓐ

WP1: WAYPOINT REPRESENTING CURRENT
       POSITION OF MOBILE ROBOT

WP2: WAYPOINT REPRESENTING
       DESTINATION OF MOBILE ROBOT

WP1: WAYPOINT REPRESENTING CURRENT
      POSITION OF MOBILE ROBOT
WP2: WAYPOINT REPRESENTING
      DESTINATION OF MOBILE ROBOT

METHOD AND APPARATUS WITH NAVIGATION PATH GENERATION

CROSS-REFERENCE TO RELATED APPLICATIONS

This application claims the benefit of the Korean Patent Application No. 10-2023-0032642 filed on Mar. 13, 2023, the entire disclosure of which is incorporated herein by reference for all purposes.

BACKGROUND

1. Field of the Invention

The present disclosure relates to a method and apparatus with navigation path generation.

2. Discussion of the Related Art

Mobile robots use maps for autonomous navigation. For example, typical mobile robots may use occupancy grid maps for autonomous navigation. An occupancy grid map is a map that stochastically represents respective probabilities of whether an (or a portion of an) obstacle, e.g., an item (object) or other obstacle, is included in respective grids into which a surrounding environment of a mobile robot is divided.

The typical mobile robots compare a previously generated occupancy grid map with a real-time generated occupancy grid map to recognize a current position, generate a path up to a destination in the real-time generated occupancy grid map, and perform autonomous navigation, based on the path.

These typical mobile robots need a previously generated occupancy grid map and a real-time generated occupancy grid map in performing autonomous navigation.

Furthermore, in a case where a coverage of the typical mobile robot is a city-scale large environment, a worker and the typical mobile robot visit a site to generate the previous occupancy grid map, and due to this, much time is needed for generating the previous occupancy grid map. Also, an occupancy grid map generated based on sensor data obtained from all sensors of the typical mobile robot is large in data capacity.

SUMMARY

In one general aspect, a processor-implemented method of a mobile computing apparatus includes generating a global path connecting a current position of the mobile computing apparatus with a future destination of the mobile computing apparatus based on a topology map that is generated based on mapping information, generating, in real time, an occupancy grid map based on sensor data obtained from a sensor of the mobile computing apparatus, the occupancy grid map representing an un-drivable area and a drivable area in a surrounding environment of the mobile computing apparatus, mapping the global path to the occupancy grid map, generating a sub-waypoint located in the drivable area in response to a next waypoint, to which the mobile computing apparatus is set to travel based on the global path, being determined to correspond to the un-drivable area, where the next waypoint is among a plurality of waypoints included in the global path, and generating a local path, for a traveling of the mobile computing apparatus, connecting the current position with the sub-waypoint.

The method may further include downloading the mapping information from a device that is external of the mobile computing apparatus, determining nodes corresponding to the plurality of waypoints and edges connecting the nodes with one another from the mapping information, and generating the topology map based on the nodes and the edges.

The generating of the global path may include selecting nodes, from among a plurality of nodes of the topology map, connecting the current position of the mobile computing apparatus with the destination of the mobile computing apparatus, setting the selected nodes to be the plurality of waypoints, and generating the global path including the plurality of waypoints and edges connecting the plurality of waypoints.

The mapping of the global path to the occupancy grid map may include converting coordinate values of a plurality of nodes of the global path into coordinate values in a coordinate system of the mobile computing apparatus.

The generating of the sub-waypoint may include generating a straight line connecting a current waypoint, representing the current position of the mobile computing apparatus, with the next waypoint in the occupancy grid map, and determining, as the sub-waypoint, a candidate waypoint determined to be located farthest away from the current waypoint in the drivable area from among a plurality of candidate waypoints along the straight line.

The generating of the sub-waypoint may include generating a straight line connecting a current waypoint, representing the current position of the mobile computing apparatus, with the next waypoint in the occupancy grid map, selecting, from among a plurality of first candidate waypoints located along the straight line, a first candidate waypoint determined to be located farthest away from the current waypoint in the drivable area, and in response to a determined distance between the current waypoint and the first candidate waypoint being determined to be less than a reference distance, rotating the straight line with respect to the current waypoint, selecting, from among a plurality of second candidate waypoints located along the rotated straight line, a second candidate waypoint determined to be located farthest away from the current waypoint in the drivable area, in response to a distance value between the current waypoint and the second candidate waypoint being determined to be greater than or equal to the reference distance value, determine the second candidate waypoint to be the sub-waypoint.

In one general aspect, a mobile computing apparatus includes one or more processors configured to map a set global path, which connects a current position of the mobile computing apparatus with a future destination of the mobile computing apparatus based on a topology map, to a real-time generated occupancy grid map that represents, based on sensor data of a surrounding environment of the mobile computing apparatus, an un-drivable area and a drivable area in the surrounding environment, and generate a local path, for a traveling of the mobile computing apparatus, connecting the current position with a sub-waypoint that corresponds to the drivable area in response to a next waypoint, to which the mobile computing apparatus is set to travel based on the global path, being determined to correspond to the un-drivable area.

The topology map may be based on mapping information generated external of the mobile computing apparatus, and the one or more processors may be configured to generate in real-time, with respect to the mobile computing apparatus being at the current position, the occupancy grid map representing the un-drivable area and the drivable area based on the sensor data that may be obtained from a sensor of the mobile computing apparatus.

The one or more processors may be configured to generate the global path in the topology map.

The one or more processors may be configured to generate the global path, which may include the one or more processors being configured to select, from among a plurality of nodes in the topology map, nodes connecting the current position with the future destination as waypoints of the mobile computing apparatus, and generate the global path including the waypoints and edges of the topology map that connect the waypoints with one another.

The apparatus may be a mobile robot and may include a driving motor, and the one or more processors may be configured to cause the traveling of the mobile robot according to the generated local path. The one or more processors may be configured to generate the topology map based on mapping information generated external of the mobile computing apparatus.

The apparatus may include a communication device, and the one or more processors may be configured to download mapping information, from a device that is external of the mobile computing apparatus, using the communication device, determine nodes corresponding to a plurality of waypoints and edges connecting the nodes with one another from the mapping information, generate the topology map based on the nodes and edges.

The one or more processors may be configured to generate the sub-waypoint located in the drivable area, which may include the one or more processors being configured to determine, in the occupancy grid map, a straight line connecting a current waypoint, representing the current position of the mobile computing apparatus, with the next waypoint, and project the next waypoint into the drivable area based on the straight line.

For the projection of the next waypoint, the one or more processors may be configured to select the sub-waypoint, from among a plurality of candidate waypoints in the drivable area that may be determined based on the straight line, that is determined to be located furthest away from the current waypoint among the plurality of candidate waypoints.

For the projection of the next waypoint, the one or more processors may be configured to determine a first candidate waypoint that is located in the drivable area furthest away, along the straight line, from the current waypoint, and in response to a determined distance between the current waypoint and the first candidate waypoint being determined to be less than a reference distance rotate the straight line, select, from among a plurality of second candidate waypoints in the drivable area that may be determined based on the rotated straight line, a second candidate waypoint determined to be located furthest away from the current waypoint in the drivable area, and determine the sub-waypoint dependent on the second candidate waypoint.

For the determining of the sub-waypoint dependent on the second candidate waypoint, the one or more processors may be configured to, in response to a determined distance value between the current waypoint and the second candidate waypoint being greater than or equal to the reference distance value, determine the sub-waypoint to be the second candidate waypoint.

In one general aspect, a processor-implemented method of a mobile computing apparatus includes mapping a set global path, which connects a current position of the mobile computing apparatus with a future destination of the mobile computing apparatus based on a topology map, to a real-time generated occupancy grid map that represents, based on sensor data of a surrounding environment of the mobile computing apparatus, an un-drivable area and a drivable area in the surrounding environment, and generating a local path, for a traveling of the mobile computing apparatus, connecting the current position with a sub-waypoint that corresponds to the drivable area in response to a next waypoint, to which the mobile computing apparatus is set to travel based on the global path, being determined to correspond to the un-drivable area, where the topology map is based on mapping information generated external of the mobile computing apparatus.

The method may further include generating in real-time, with respect to the mobile computing apparatus being at the current position, the occupancy grid map representing the un-drivable area and the drivable area based on the sensor data that is obtained from a sensor of the mobile computing apparatus.

The method may further include downloading the mapping information from a device external of the mobile computing apparatus, determining nodes corresponding to a plurality of waypoints and edges connecting the nodes with one another from the mapping information, and generating the topology map based on the nodes and edges.

The method may further include generating the sub-waypoint located in the drivable area, which may include determining, in the occupancy grid map, a straight line connecting a current waypoint, representing the current position of the mobile computing apparatus, with the next waypoint, selecting a first candidate waypoint determined to be located farthest away from the current waypoint in the drivable area from among a plurality of candidate waypoints determined along the straight line, and in response to a determined distance between the current waypoint and the first candidate waypoint being less than a reference distance, rotating the straight line with respect to the current waypoint, selecting a second candidate waypoint determined to be located farthest away from the current waypoint in the drivable area from among a plurality of candidate waypoints determined along the rotated straight line, and in response to a determined distance between the current waypoint and the second candidate waypoint being greater than or equal to the reference distance value, determining the sub-waypoint to be the second candidate waypoint.

BRIEF DESCRIPTION OF THE DRAWINGS

FIG. 2 is a flowchart illustrating a method of generating a path for autonomous navigation of a mobile computing apparatus according to various embodiments.

FIGS. 13 and 14 are flowcharts illustrating a sub-waypoint generating method for generating a local path of a mobile computing apparatus according to various embodiments.

Figure 1:
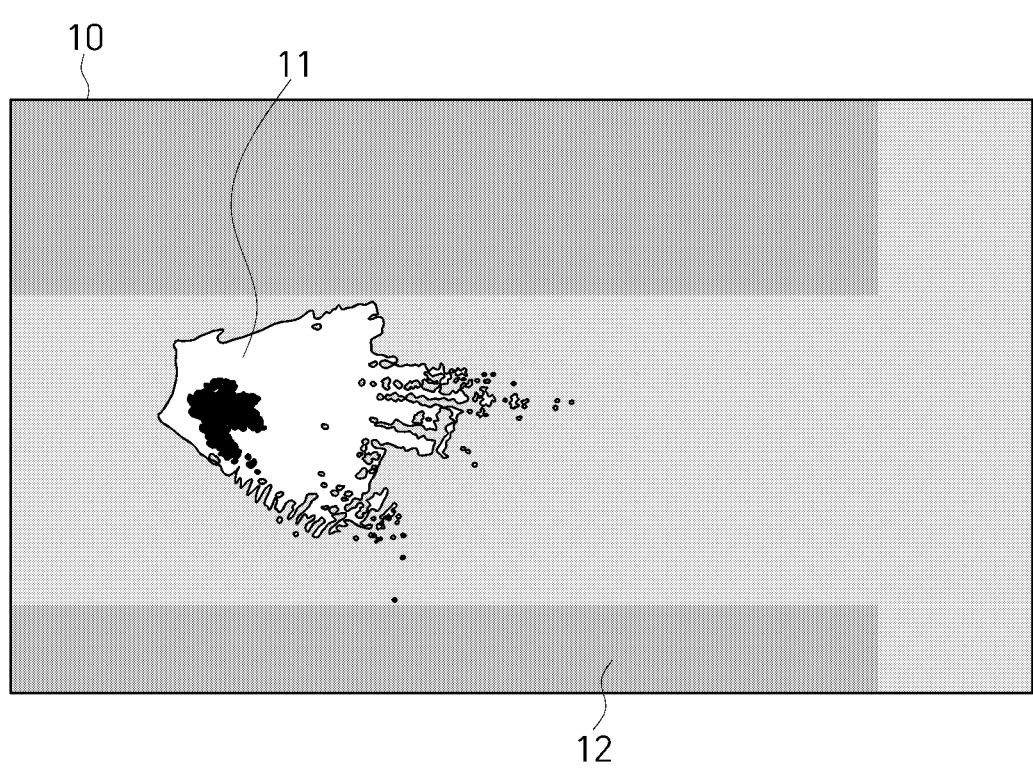
FIG. 1 illustrates an occupancy grid map generated in real-time by a mobile computing apparatus.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION OF THE INVENTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments" and "in various embodiments").

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

In an arbitrary situation, expression "device configured to perform~" may denote that the device "performs~" together with another device or parts. As non-limiting examples, the phrasing "processor configured (or set) to perform A, B, and C" herein may denote a dedicated processor (for example, an embedded processor) for performing a corresponding operation and/or a general-use processor (for example, a central processing unit (CPU) and/or an application processor (AP)) which may execute one or more processor-readable (e.g., executable) instructions stored in one or more memories to, upon execution by the processor, configure the processor to perform one or more or any combination of the operations described herein.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

FIG. 1 illustrates an occupancy grid map generated in real-time by a mobile computing apparatus. As illustrated in FIG. 1, an occupancy grid map 10 may be generated in real-time with respect to the surroundings of the mobile computing apparatus in one or more directions or a field of view (FOV), e.g., of one or more sensors on a frontal portion of the mobile computing apparatus, as a non-limiting example. Thus, the illustrated area 11 of the real-time generated occupancy grid map 10 may correspond to positions/locations that the mobile computing apparatus for which the probability of occupancy of the corresponding grid may be determined. For example, the illustrated area 11 may include drivable and un-drivable portions based on results of the generating of the real-time occupancy grid map. Rather, the illustrated area 12 of the real-time generated grid map 10 may be area(s) in which the mobile computing apparatus has not yet (and has not previously) moved or traveled, and thus, for which the real-time generated grid map would not have information on whether a location in the area 12 includes an obstacle, such as whether there is a high or low probability that the location is a drivable area or is a non-drivable area, as a non-limiting example.

In a typical autonomous navigation technique, a typical mobile device cannot generate a path, between a current location and a future destination within a real-time generated occupancy grid map generated by the typical mobile device, without the use of a previously generated occupancy grid map that was generated at a previous time based on a previous traveling of the typical mobile robot to the area corresponding to the future destination. As a non-limiting example, the typical autonomous navigation technique cannot identify a corresponding waypoint for the future destination based only on a real-time generated occupancy grid map, such as the occupancy grid map 10, because the typical autonomous navigation technique requires the future destination to have already been mapped, i.e., the probability of whether that future location includes an obstacle must have already been determined in at least one previously generated occupancy grid map if the obstacle probability of the same location is not provided in the generated real-time occupancy grid map. Here, the real-time generated occupancy grid map 10 may also be referred to as a current or currently generated occupancy grid map, which may include locations (e.g., grids) for which an obstacle probability may be determined and one or more other locations (e.g., one or more other grids) for which an obstacle probability is not provided in the resultant real-time (currently) generated occupancy grid map.

For example, such as in the case where a coverage of a typical mobile robot is a city-scale large environment, a worker should move a typical mobile device to a site where the typical mobile device is to be operated, and then, should follow the typical mobile device as the mobile robot generates obstacle probabilities in the generation of the previous occupancy grid map. Also, because this previously generated occupancy grid map was generated based on sensor data obtained through many or all sensors equipped in the typical mobile device, the data capacity of the memory of the typical mobile device must be large to store all information of this previously generated occupancy grid map. Additionally, due to such large data storage requirements, maintenance and management of the typical mobile device are difficult.

Various embodiments may include a method and apparatus that may generate an occupancy grid map without a process of visiting a site to previously generate the occupancy grid map and may generate a path for autonomous navigation of the mobile robot by using a topology map, e.g., having a small data capacity.

Furthermore, when the topology map is a brief map where a relationship of streets marked in a satellite map is represented by nodes and edges connecting the nodes with one another, a data size may be less than an occupancy grid map, a time for generating a local map may decrease, and maintenance and management may be easy.

The topology map may be an inaccurate map where a street capable of navigation of a mobile robot is briefly represented by a node and an edge, and thus, in an example a typical mobile robot would not typically generate a path for autonomous navigation by singly using the topology map. This may be because, in a case where a node of the topology map is set to a waypoint of the typical mobile robot, the node set to the waypoint may be located in an un-drivable area such as a road or street trees.

FIG. 2 is a flowchart illustrating a method of generating a path for autonomous navigation of a mobile computing apparatus according to various embodiments.

Referring to FIG. 2, first, in operation S110, a topology map may be obtained or generated, e.g., using satellite map information or other map information. In an embodiment, operation S110 may be performed by an external computing device capable of wired/wireless communication, e.g., using a communication system of the external computing device, to obtain the satellite or other map information. As a non-limiting example, the external computing device may be, for example, a smartphone, a tablet personal computer (PC), a desktop PC, a laptop PC, a netbook computer, a workstation, a server, a portable digital assistant (PDA), or a portable multimedia player (PMP).

The external computing device is representative of a processor, a memory, an input/output (I/O) interface, a display, and a communication interface. Here, the processor may be at least one central processing unit (CPU), at least one graphics processing unit (GPU), at least one microcontroller unit (MCU), at least one system on chip (SoC), or at least one application processor (AP). The processor of the external computing device may execute instructions (e.g., processor-executable instructions) stored in the memory of the external computing device, where execution of the instructions by the processor configures the processor to perform operation S110.

In an embodiment, operation S110 may be performed by a processor (i.e., one or more processors) of the mobile computing apparatus, e.g., using a communication system of the mobile computing apparatus capable of wired/wireless communication to obtain the satellite or other map information. In an embodiment, the mobile computing apparatus may further include the external computing device, and the external computing device may perform operation S110.

Thus, as a non-limiting example, below discussions may be based on the external computing device generating a topology map and transmitting the generated topology map to the mobile computing apparatus. However, embodiments are not limited thereto, as such below discussions with respect to the generating of the topology map and use of the generated topology map are equally applicable to embodiments where any processor of the mobile computing apparatus obtains the satellite or other map information and/or generates the topology map, as a non-limiting example.

In operation S120, a global path may be generated. The global path may connect a current position of the mobile computing apparatus with a destination of the mobile computing apparatus in the topology map received from the external computing device.

In operation S130, an occupancy grid map may be generated. The occupancy grid map represents an un-drivable area and a drivable area of the mobile computing apparatus based on sensor data obtained from sensors (e.g., a Lidar sensor, a camera sensor, and/or a depth sensor, as non-limiting examples) of the mobile computing apparatus. Here, the occupancy grid map may be a metric map which fundamentally defines whether a space is empty. Herein, while operation S130 is illustrated as being performed after operation S120, embodiments are not limited thereto and operation S130)may be performed prior to operation S120 or may be performed in parallel or simultaneously with operation S120.

In operation S140, the global path, generated in the topology map, may be mapped to the occupancy grid map based on a coordinate system of the mobile computing apparatus, e.g., from a perspective of the mobile computing apparatus. Such a mapping of the global path may denote a process of aligning the occupancy grid map in the topology map.

In operation S150, the mobile computing apparatus may determine whether a next waypoint, to which the mobile computing apparatus may be set to move to from a current position and among a plurality of waypoints included in the global path mapped to the occupancy grid map, is located in the un-drivable area. When the next waypoint is determined to be located in the un-drivable area, the mobile computing apparatus may perform operation S160, and when the next waypoint is determined to be located in the drivable area, the mobile computing apparatus may perform operation S180.

In operation S160, based on the next waypoint having been determined to be located in the un-drivable area, a sub-waypoint located in the drivable area may be generated.

In operation S170, a local path connecting the current position with the sub-waypoint may be generated.

In operation S180, based on the next waypoint having been determined to be located in the drivable area, a local path connecting a current position of the mobile computing apparatus with the next waypoint may be generated.

Figure 3:
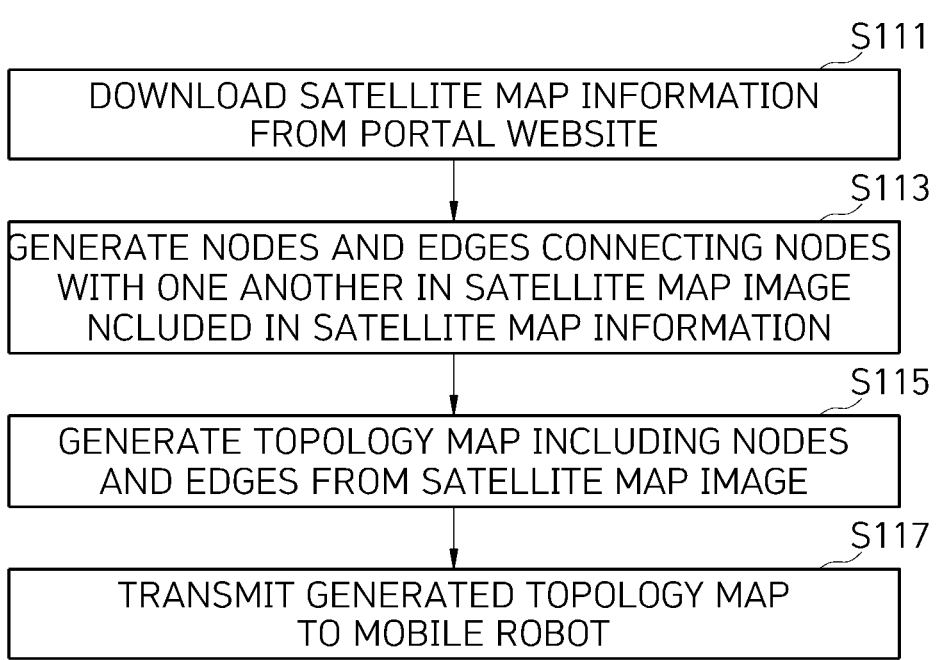
FIG. 3 is a flowchart illustrating a method of generating a topology map according to various embodiments.
Figure 4:
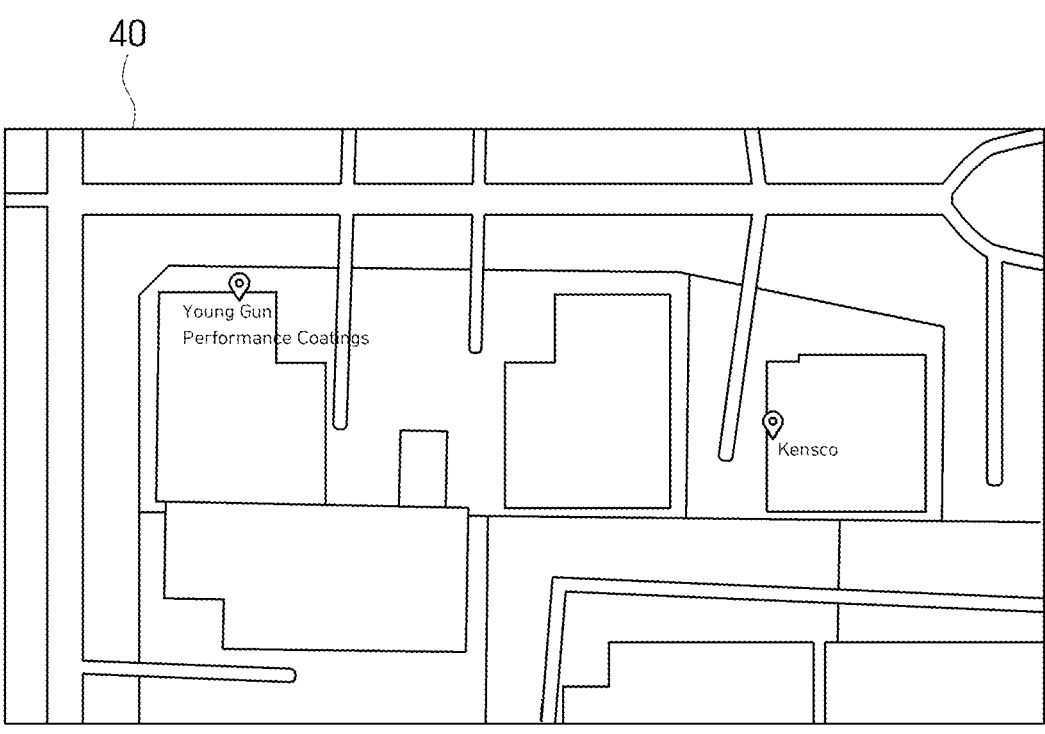
FIGS. 4 to 6 are diagrams illustrating a method of generating a topology map according to various embodiments.
Figure 5:
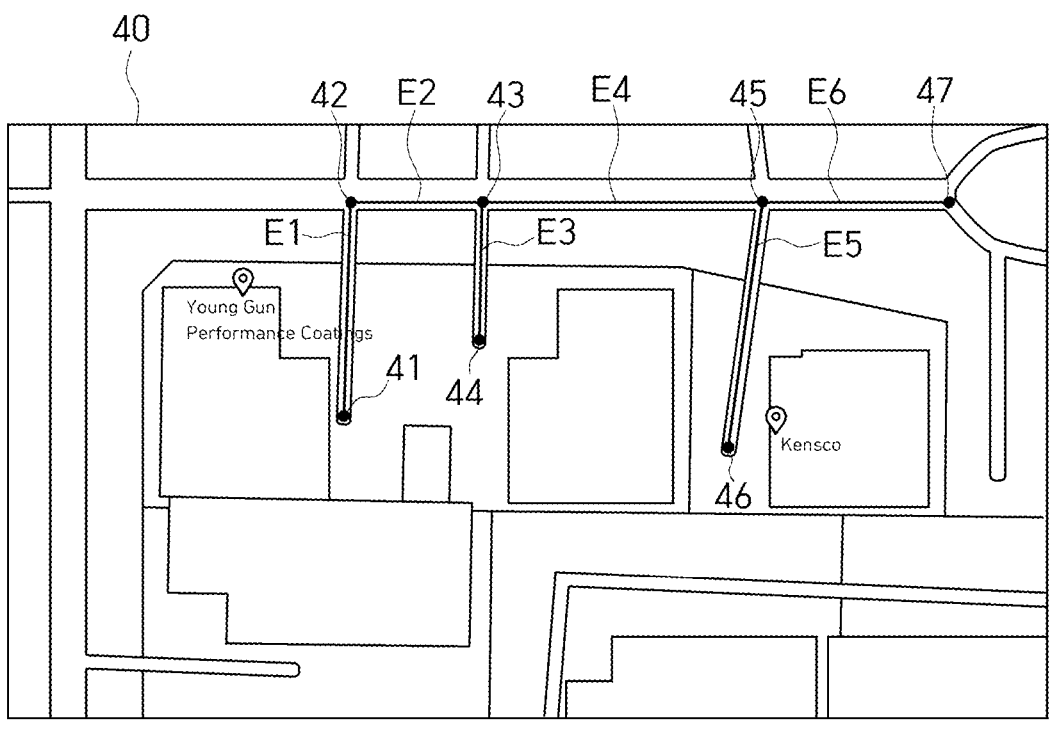
Figure 6:
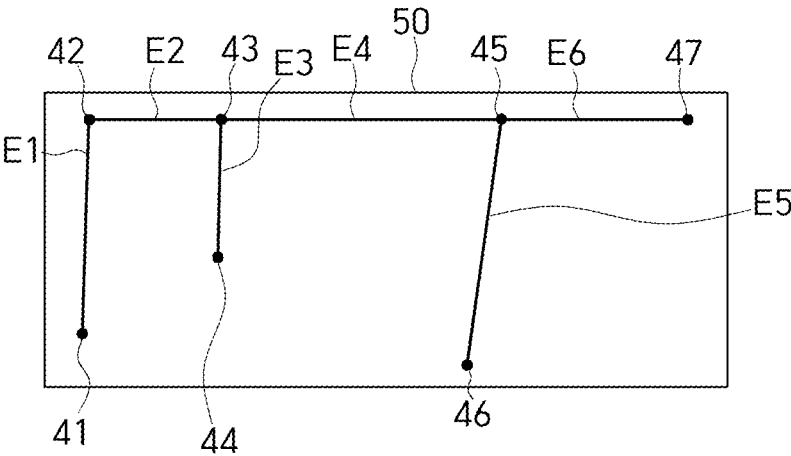

FIG. 3 is a flowchart illustrating a method of generating a topology map according to various embodiments, and FIGS. 4 to 6 are diagrams schematically illustrating a method of generating a topology map according to various embodiments. In an example, the method of generating the topology map illustrated in FIGS. 4-6 may correspond to the method of generating the topology map illustrated in FIG. 3.

In various embodiments, it may be characterized that an autonomous navigation path of a mobile computing apparatus is generated by using a real-time generated occupancy grid map and a topology map, e.g., instead of or without using a previously generated occupancy grid map.

As a non-limiting example, a topology map may be a map which is generated based on satellite map information. The topology map may be a low-resolution map where a relationship of streets marked in a satellite map is represented by nodes and edges connecting the nodes with one another.

Referring to FIG. 3, first, in operation S111, satellite map information may be downloaded using a communication interface of an external computing device accessing a portal website such as "Naver" or "Google", as non-limiting example, e.g., using a wired or wireless communication scheme. Here, as non-limiting examples, the satellite map information may include a satellite map image or map image (e.g., satellite map image 40 of FIG. 4) and attribute information about an object included in the satellite map image 40. The object may include, for example, a road, a sidewalk, a street, a crosswalk, a building, and a store. The attribute information may include, for example, a length of the object and global positioning system (GPS) coordinate information (for example, altitude and longitude) about the object.

In operation S113, nodes (e.g., nodes 41 to 47 of FIG. 5) and edges (e.g., edges E1 to E6 of FIG. 5), which connect the example nodes 41 to 47 with one another, may be respectively generated by the processor of the external computing device using the satellite map image 40, e.g., based on a user input command input through a graphical user interface (GUI) of the external computing device, as a non-limiting example. For example, the generated nodes may include example points 41, 44, and 46 near a building gate or a store gate, example junctions (e.g., junctions 42, 43, 45, and 47) of edges, e.g., of sidewalk(s) and/or street(s), and GPS coordinate information of/for each of the generated nodes. In an example, the junctions 42, 43, 45, and 47 may correspond to the junctions or meeting points between edges. As non-limiting examples, respective edges may include or represent any one or any combination of two or more of sidewalks at both sides of road(s), street(s), and crosswalk(s), and may include respective GPS coordinate information and length information of the edges.

In operation S115, the generated nodes (e.g., nodes 41 to 47 of FIG. 5) and the generated edges (e.g., edges E1 to E6 of FIG. 5) may be extracted or obtained, e.g., from respective results of respective processor results of the generation operations of operation S113, and the topology map (e.g., topology map 50 of FIG. 6) may be generated including the extracted or obtained nodes and the extracted or obtained edges.

In operation S117, the generated topology map may be transmitted to the mobile computing apparatus using the communication system of the external device.

Figure 7:
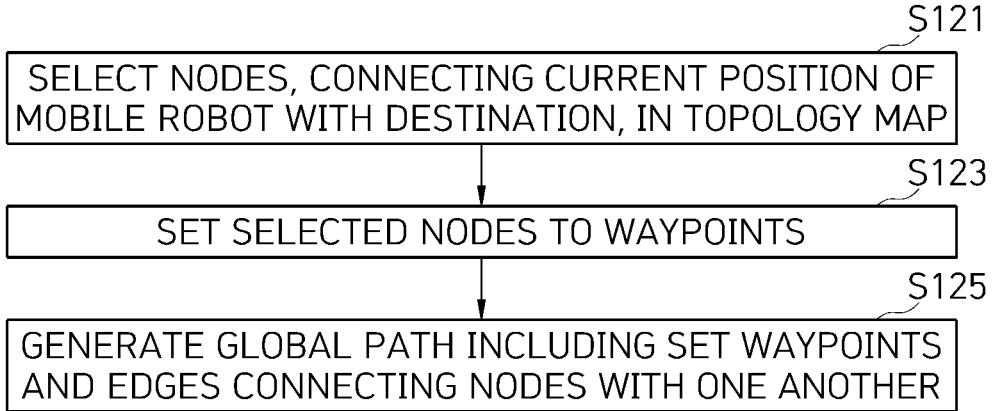
FIG. 7 is a flowchart illustrating a method of generating a local path in a topology map according to various embodiments.

FIG. 7 is a flowchart illustrating a method of generating a local path in a topology map according to various embodiments. As a non-limiting example, the generating of the local path may correspond to operation S120 of FIG. 1.

Referring to FIG. 7, in operation S121, nodes, for connecting a current position of a mobile computing apparatus with a future destination of the mobile computing apparatus, may be selected from among the nodes generated in the topology map (e.g., topology map 50 of FIG. 6) received from the external computing device and edges connecting the selected nodes with one another. For example, when the current position of the mobile computing apparatus is near a node (e.g., node 41 of FIG. 6) and a destination of the mobile computing apparatus is another node (e.g., node 44 of FIG. 6) in FIG. 6, nodes 41, 42, 43, and 44 and edges E1, E2, and E3 may be selected, as a non-limiting example.

In operation S123, selected nodes (e.g., any combination of two or more of nodes 41, 42, 43, and 44 of FIG. 6) may be set to be waypoints for the moving of the mobile computing apparatus to the destination.

In operation S125, the global path including the set waypoints (e.g., nodes 41, 42, 43, and 44 of FIG. 6) and the edges (e.g., edges E1, E2, and E3 of FIG. 6) connecting the nodes with one another may be generated.

As described above, nodes generated in a topology map may be waypoints of a mobile computing apparatus. When a destination is set in the topology map, a global path include waypoints corresponding to nodes between the destination and a current position of the mobile computing apparatus.

When the global path is generated, a local path may be generated subsequently. For example, when the current position of the mobile computing apparatus is near the node (e.g., node 41 of FIG. 6) and the destination of the mobile computing apparatus is another node (e.g., node 44 of FIG. 6) in FIG. 6, the local path may include a first waypoint (e.g., node 41 of FIG. 6) representing the current position of the mobile computing apparatus, a second waypoint (e.g., node 42 of FIG. 6), and an edge E connecting the example first and second waypoints with each other. The mobile computing apparatus may drive along the example local path(s) corresponding to the first and second waypoints and edge E1, and when the mobile computing apparatus arrives at the second waypoint, the mobile computing apparatus may drive toward a third waypoint (e.g., corresponding to node 43 of FIG. 6) along a new local path including the second waypoint, the third waypoint, and an edge E2 connecting the second and third waypoints with each other. In this manner, the mobile computing apparatus may arrive at a final destination (e.g., corresponding to node 44 of FIG. 6).

Furthermore, when an example global path is generated using or in an example low-resolution topology map, it may not be guaranteed that a position of a node is accurately generated in an area which enables the mobile computing apparatus to drive like a sidewalk. That is, a real position of a node may be an area incapable of driving by the mobile computing apparatus like forest, street trees, roads, or stairs, as non-limiting examples.

Unlike persons, when a waypoint is not located in a drivable area, a mobile computing apparatus may not drive. That is, when a node generated in a low-resolution topology map is converted into waypoints of the mobile computing apparatus, the converted waypoints may be located in an area incapable of driving to or by the mobile computing apparatus, and thus, a destination of the mobile computing apparatus may not be located in an area incapable of driving to or by the mobile computing apparatus. Accordingly, a situation where the mobile computing apparatus is incapable of generating a local path may occur.

To solve such a problem, one or more embodiments may provide a method of generating a local path of a mobile computing apparatus in or using a real-time generated occupancy grid map by using a global path generated in (or based on) a low-resolution topology map.

Various sensors such as one or more Lidar sensors, one or more camera sensors, and/or one or more depth sensors, which may be used to recognize a drivable area, may be equipped in a mobile computing apparatus according to various embodiments, and an occupancy grid map may be generated in real-time based on sensor data obtained by the sensor(s). As a non-limiting example, the generation of the occupancy grid map may correspond to operation S130 of FIG. 1.

An occupancy grid map may be generated with respective information of drivable area(s) and un-drivable area(s) in grid units. For explanatory purposes, the un-drivable area(s) are illustrated in FIG. 1, for example, as a black portion (e.g., with multiple corresponding grids of the occupancy grid map 10 being represented in the illustrated black portion of area 11), while the drivable area(s) are illustrated as the remaining empty (non-black) portions of area 11 of FIG. 1, both of which are distinguished from the remaining area 12 of FIG. 1, though area 12 may also be considered a non-drivable area because the drivability of the same may not be known. In an example, the drivable area(s) may be represented in the occupancy grid map in respective grid units.

As a non-limiting example, an occupancy grid map may be generated by performing an image processing operation based on sensor data of one or more sensors equipped in the mobile computing apparatus. As a non-limiting example, the one or more sensors may be configured to sense a forward region with respect to the mobile computing apparatus, and obtain/capture forward image(s). Image processing may be performed on such a forward image to segment respective objects, such as road(s), sidewalk(s), crosswalk(s), road boundaries, e.g., boundary stones or other physical road-based boundaries, or a forest, as non-limiting examples, from the obtained forward image. The mobile computing apparatus may further perform a recognition operation with respect to each of the segmented objects. For example, a segmented object may be recognized in the recognition operation as a sidewalk or a crosswalk, e.g., which may be example recognition results that represent drivable area(s). Due to a limitation of object segmentation techniques, the occupancy grid map may include or display, as a drivable area, a region, e.g., a forward region, as represented in the obtained forward image, that is within 10 meters from the mobile computing apparatus. The occupancy grid map may also be generated based on any other existing occupancy grid map techniques, and thus, for brevity purposes below discussions will provide further explanations of remaining operations and configurations of the mobile computing apparatus.

As a non-limiting example, a topology map may be based on a world coordinate system, such as a GPS coordinate system, while an occupancy grid map may be based on a coordinate system of the mobile computing apparatus. The world coordinate system and the coordinate system of the mobile computing apparatus may differ in origin, rotation angle, and/or scale, for example. Therefore, in order to map the global path, e.g., generated in the topology map, to the occupancy grid map, a mobile computing apparatus may convert coordinate values of one or more waypoints of the global path in the topology map into coordinate values expressed in the coordinate system of the mobile computing apparatus using a coordinate system conversion algorithm, such as expressed below in Equation 1.

$$X = [\begin{matrix} x & y \end{matrix}]^T$$

$$X' = RX + T$$

$$R = \begin{bmatrix} \cos\theta & \sin\theta \\ -\sin\theta & \cos\theta \end{bmatrix}$$

$$T = [\begin{matrix} x_{origin} & y_{origin} \end{matrix}]$$

Equation 1

Here, $[x\ y]$ may denote a row-direction matrix representing coordinates of a node in the topology map, $[]^T$ may denote a column-direction matrix obtained by transposing the row-direction matrix, $X'$ may denote coordinates of the coordinate system, $X$ may denote coordinates of the topology map, $R$ may denote a rotation matrix, $e$ may denote a rotation angle between the topology map and the coordinate system, and $T$ may denote a horizontal translation matrix. Also, $x_{origin}$ and $y_{origin}$ may denote origins of the coordinate system of the mobile computing apparatus. As a non-limiting example, this conversion map may correspond to operation S140 of FIG. 1.

Figure 8:
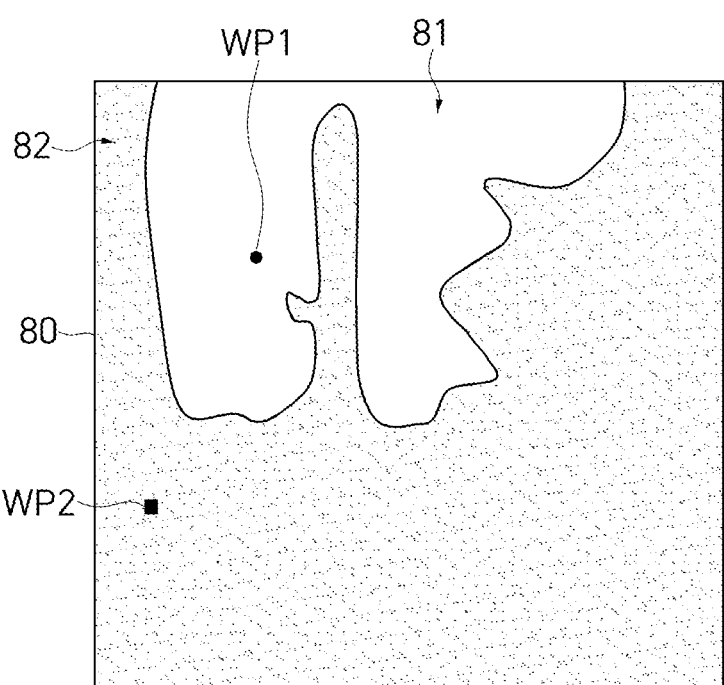
FIG. 8 is a diagram illustrating a position of a waypoint marked in an occupancy grid map in a case where the waypoint generated in a topology map may be mapped to the occupancy grid map.

FIG. 8 is a diagram illustrating a position of a waypoint marked or reflected in an occupancy grid map, e.g., in the coordinate system of the mobile computing apparatus, for example. The waypoint may have been first generated in a topology map according to various embodiments, and then mapped to the occupancy grid map.

In typical autonomous navigation techniques, when a next waypoint is located in an un-drivable area, such as un-drivable area 82 of FIG. 8, the typical mobile device would not perform further processing. For example, because the next waypoint is located in the un-drivable area, a corresponding local path will not be generated, or autonomous navigation would not be performed based on any local path generated from that next waypoint located in the un-drivable area.

Referring to FIG. 8, when a mobile computing apparatus generates in real-time an occupancy grid map 80 representing a valid drivable area 81 by grid units in a forward region within a distance of 10 meters (as a non-limiting example) from the mobile computing apparatus, when a coordinate value of a next waypoint WP2 with respect to a waypoint WP1 representing a current position of the mobile computing apparatus), is converted into the second coordinate value expressed in the coordinate system of the mobile computing apparatus there is a high probability that the next waypoint WP2 at the second coordinate value in the occupancy grid map 80 will correspond to an un-drivable area (or an unseen area) 82 of the real-time generated occupancy grid map 80.

Accordingly, in various embodiments, the mobile computing apparatus may generate a sub-waypoint corresponding to the next waypoint WP2 that would have had the second coordinate value in the un-drivable area 82 of the generated real-time occupancy grid map 80. The sub-waypoint may be generated using a waypoint projection algorithm, and a local path may be generated in the generated real-time occupancy grid map 80 connecting the current position WP1 of the mobile computing apparatus in the generated real-time occupancy grid map 80 with the generated sub-waypoint in the generated real-time occupancy grid map 80. As a non-limiting example, the generation of the sub-waypoint may correspond to operation S160 of FIG. 1.

Figure 9:
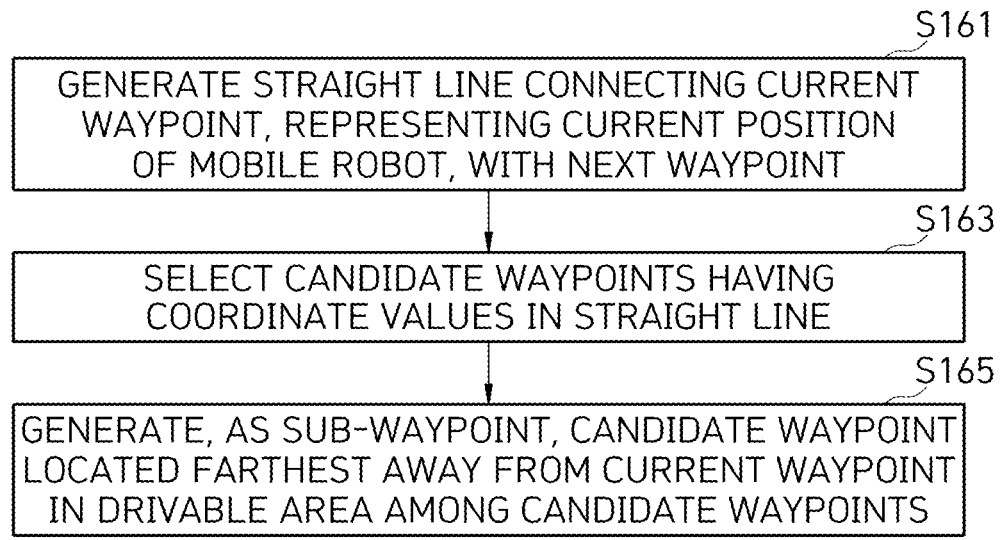
FIG. 9 is a flowchart illustrating a sub-waypoint generating method for generating a local path of a mobile computing apparatus according to various embodiments.
Figure 10:
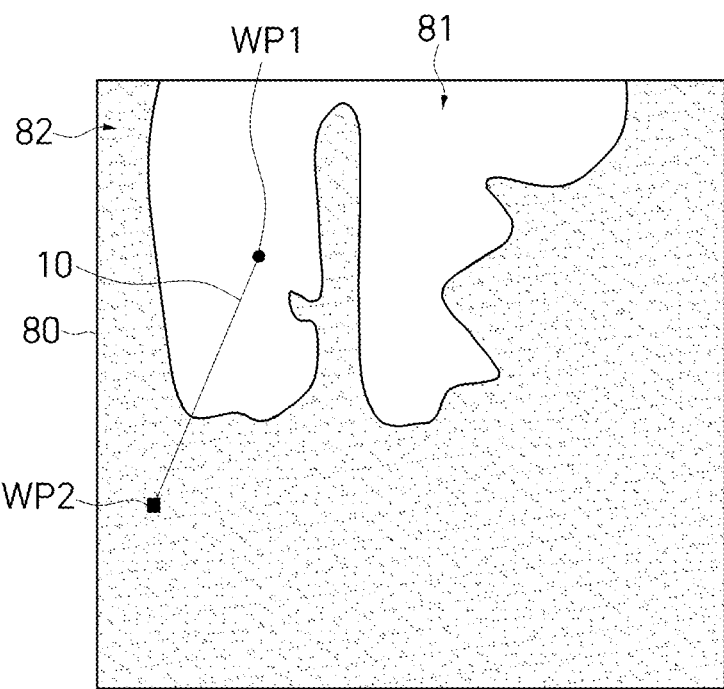
FIGS. 10 to 12 are diagrams illustrating a sub-waypoint generating method according to various embodiments.
Figure 11:
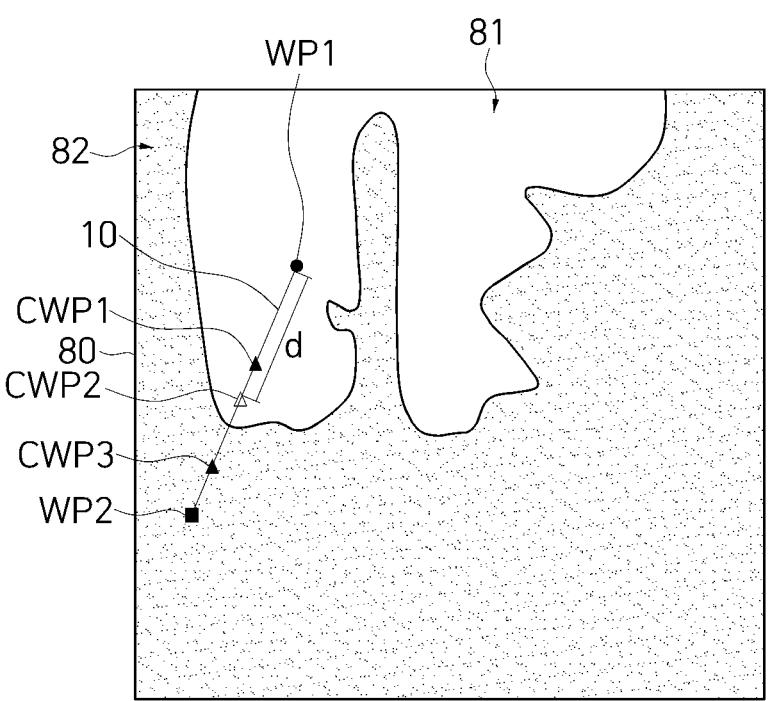
Figure 12:
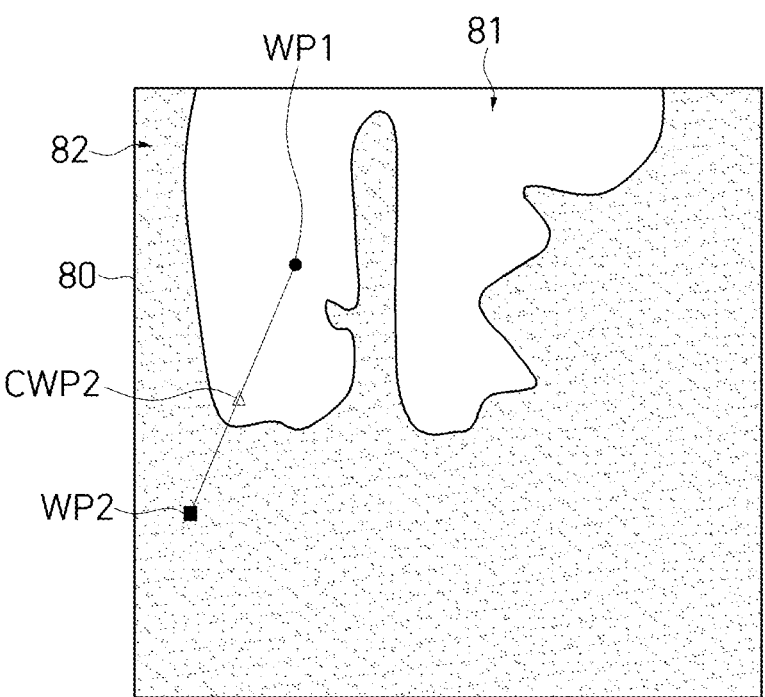

FIG. 9 is a flowchart illustrating a sub-waypoint generating method for generating a local path of a mobile computing apparatus according to various embodiments, and FIGS. 10 to 12 are diagrams illustrating a sub-waypoint generating method according to various embodiments. As a non-limiting example, the sub-waypoint generating method of FIGS. 10-12 may correspond to the sub-waypoint generating method of FIG. 9.

Referring to FIG. 9, first, a mobile computing apparatus may generate an occupancy grid map, convert the generated occupancy grid map into an image, and through a performed image processing (or preprocessing) on the occupancy grid image the mobile computing apparatus may erode an occupancy grid map image so as to secure a buffer region.

In operation S161, as illustrated in FIG. 10, the mobile computing apparatus may generate a straight line 10 connecting a current waypoint WP1, representing a current position of the mobile computing apparatus in the occupancy grid map 80, with a next waypoint WP2 to which the mobile computing apparatus is to be moved. In this case, when the next waypoint WP2 is located in the un-drivable area 82 in the occupancy grid map 80 a sub-waypoint is generated, based on the next waypoint WP2, for performing autonomous navigation of the mobile computing apparatus.

In operation S163, as illustrated in FIG. 11, the mobile computing apparatus may select a plurality of candidate waypoints CWP1, CWP2, and CWP3 having coordinate values in/along the straight line 10.

In operation S165, as illustrated in FIG. 12, the mobile computing apparatus may generate a sub-waypoint SWP by selecting, from among the plurality of candidate waypoints CWP1, CWP2, and CWP3, the sub-waypoint SWP to be the candidate waypoint CWP2 that is determined to be located furthest away from the current waypoint WP1 in the drivable area 81. The current waypoint WP1 represents the current position of the mobile computing apparatus.

When the generating of the sub-waypoint SWP is completed, the mobile computing apparatus may generate a local path, in the occupancy grid map 80, connecting the current waypoint WP1 with the sub-waypoint SWP, and then, may perform autonomous navigation, based on the local path.

Figure 14:
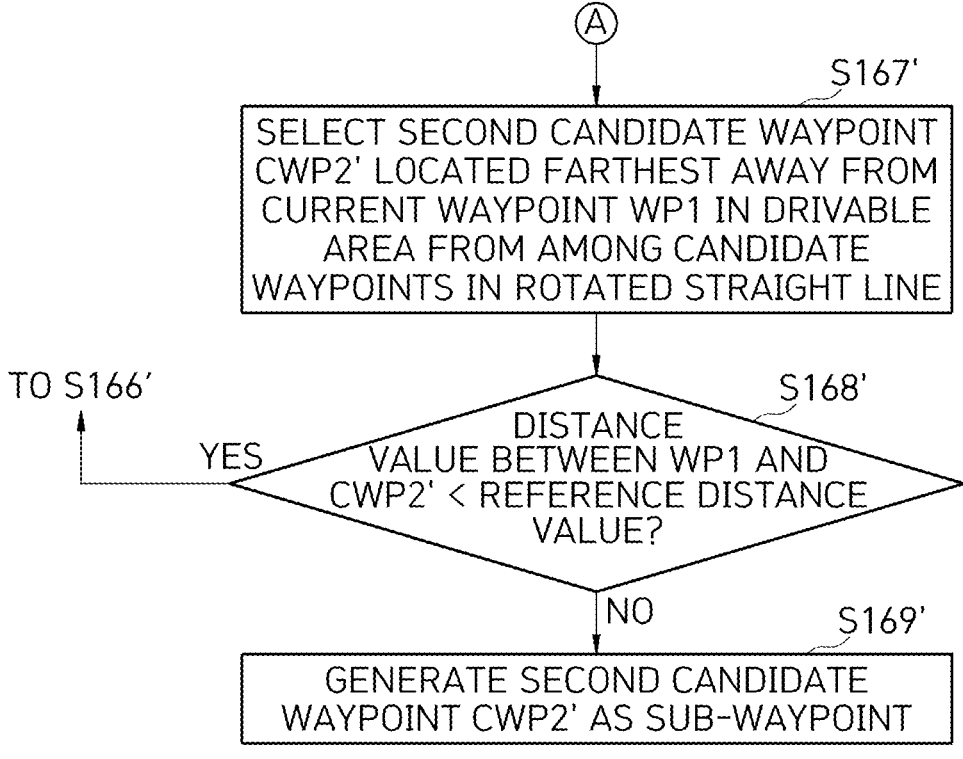
Figure 15:
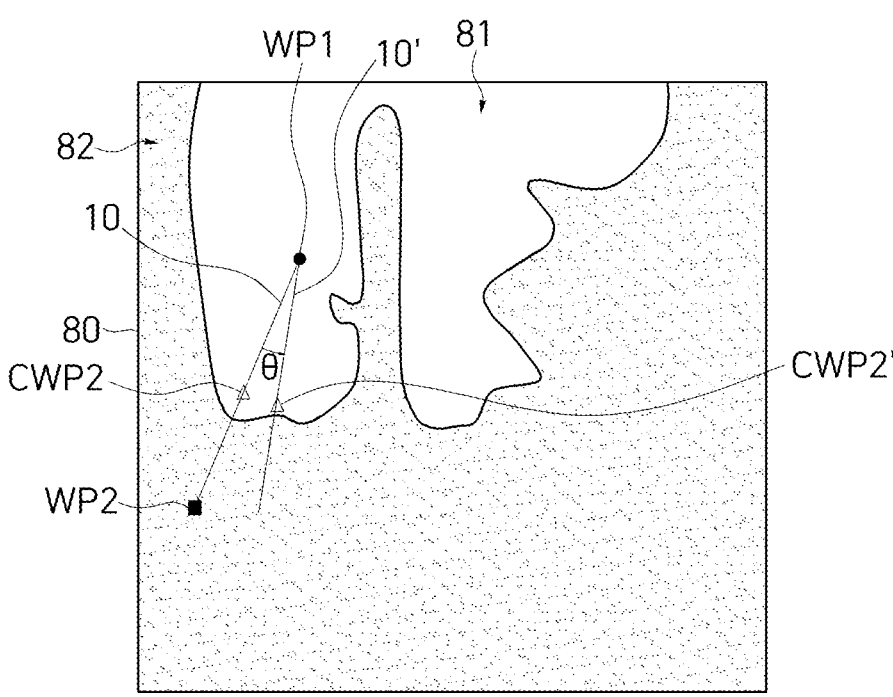
FIGS. 15 and 16 are diagrams illustrating a sub-waypoint generating method according to various embodiments.
Figure 16:
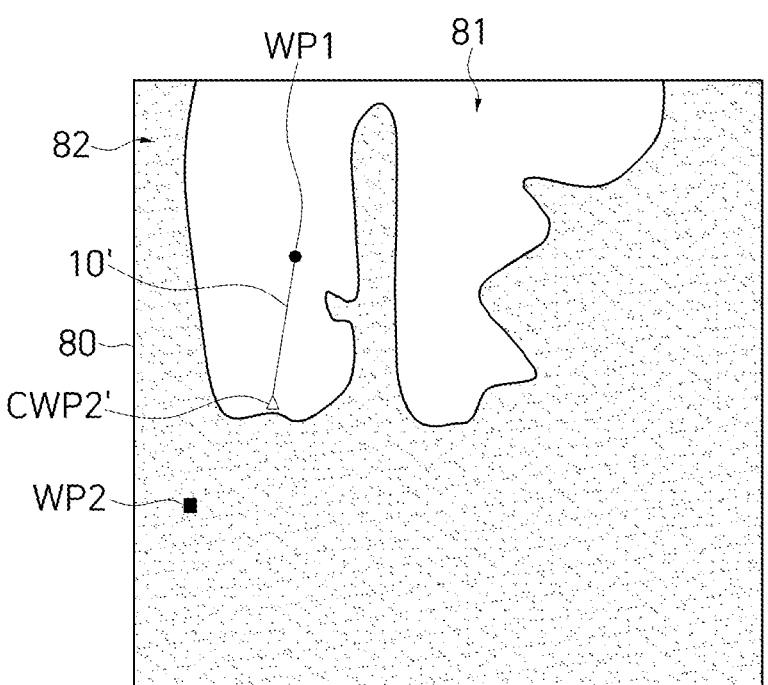

FIGS. 13 and 14 are flowcharts illustrating a sub-waypoint generating method for generating a local path of a mobile computing apparatus according to various embodiments, and FIGS. 15 and 16 are diagrams illustrating a sub-waypoint generating method according to various embodiments. As a non-limiting example, the sub-waypoint generating method of FIGS. 15-16 may correspond to the sub-waypoint generating method of FIGS. 13 and 14.

Referring to FIG. 13, in operation S161', as illustrated in FIG. 14, a mobile computing apparatus may generate a straight line 10 connecting a current waypoint WP1, representing a current position of the mobile computing apparatus in an occupancy grid map 80, with the next waypoint WP2.

In operation S162', the mobile computing apparatus may select a plurality of candidate waypoints (CWP1, CWP2, and CWP3 of FIG. 11) having coordinate values (coordinate values where GPS coordinate values are expressed in a robot coordinate system of the mobile computing apparatus) in the straight line 10.

In operation S163', the mobile computing apparatus may select a first candidate waypoint CWP2 located farthest away from the current waypoint WP1 in the drivable area 81 from among the plurality of candidate waypoints.

In operation S164', the mobile computing apparatus may compare a reference distance value din with a distance value between the current waypoint WP1 and the first candidate waypoint CWP2.

In operation S165', when the distance value (d of FIG. 11) is greater than or equal to the reference distance value din, the mobile computing apparatus may generate the first candidate waypoint CWP2 as a sub-waypoint. With respect to FIG. 13, when the first candidate waypoint CWP2 is determined as a sub-waypoint, the mobile computing apparatus may generate a local path connecting the current waypoint WP1 with the sub-waypoint CWP2 and may perform autonomous navigation, based on the local path.

In operation S166', when the distance value (d of FIG. 11) is less than the reference distance value din, as illustrated in FIG. 15, the mobile computing apparatus may rotate the straight line 10 by a certain angle $\theta$ with respect to the current waypoint WP1. Here, the certain angle may be, for example, about 1 degree.

In operation S167', the mobile computing apparatus may select a second candidate waypoint CWP2' located farthest away from the current waypoint WP1 in the drivable area 81 from among the plurality of candidate waypoints having coordinate values in a rotated straight line 10'.

In operation S168', the mobile computing apparatus may compare the reference distance value $d_{th}$ with a distance value d' between the current waypoint WP1 and a second candidate waypoint CWP2'.

In operation S169', when the distance value d' is greater than or equal to the reference distance value $d_{th}$, the mobile computing apparatus may generate the second candidate waypoint CWP2' as the sub-waypoint. With respect to FIG. 16, the mobile computing apparatus may generate a local path connecting the current waypoint WP1 with the second candidate waypoint CWP2'.

In operation S168', when the distance value d' is less than the reference distance value $d_{th}$, the mobile computing apparatus may sequentially perform steps S166' to S168' until a candidate waypoint satisfying a condition based on step S168' is found.

As described above, with respect to the generating of the sub-waypoint, as a sub-waypoint may be determined by comparing the reference distance value with a distance value between the current waypoint WP1 of the mobile computing apparatus and the candidate waypoints CWP2 and CWP2' located in the straight lines 10 and 10', the mobile computing apparatus may generate a local path which uses a drivable area marked in an occupancy grid map.

Figure 17:
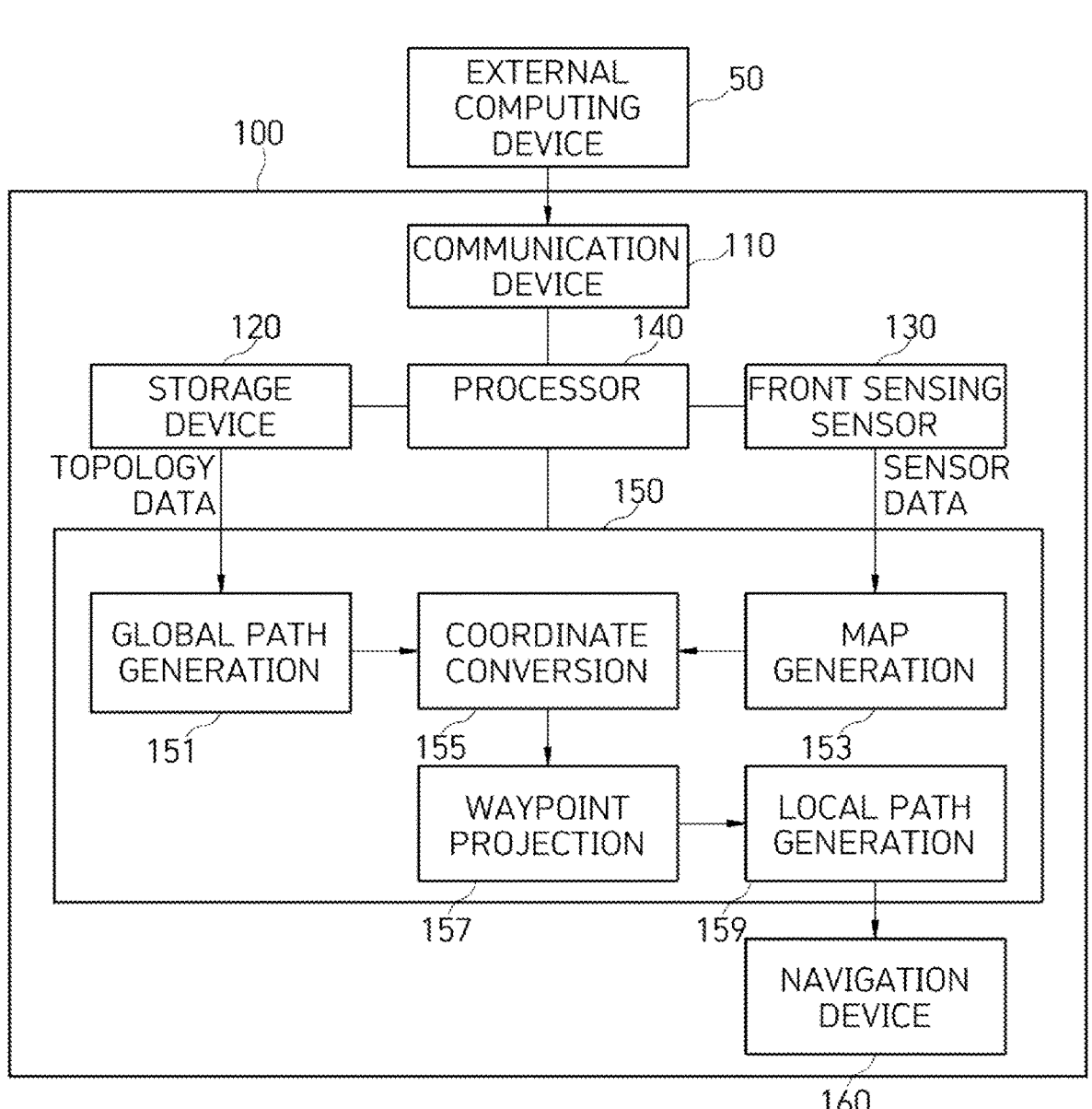
FIG. 17 is a block diagram illustrating a mobile computing apparatus according to various embodiments.

FIG. 17 is a block diagram illustrating a mobile computing apparatus according to various embodiments.

Referring to FIG. 17, a mobile computing apparatus 100 according to various embodiments may generate a local path in a real-time generated occupancy grid map by using a topology map.

To this end, the mobile computing apparatus 100 may include a communication device (or system) 110, a storage device 120, a sensing sensor 130, a processor 140, and a navigation device 160.

The communication device 110 may be configured to interface with other devices and systems through wired and/or wireless communication interfaces. In an example, the communication device 110 may be configured to request, receive/download, or otherwise obtain topology map data (hereinafter referred to as a topology map) from another device or service. For example, the other device may be an external computing device 50. As a non-limiting example, wireless communication through one or more wireless communication interfaces may include, for example, mobile communication such as 3G, LTE, 4G, and 5G and close-distance wireless communication such as WiFi and Bluetooth using the one or more wireless communication interfaces that are configured according to such wireless communication standards.

The sensor 130 may include one or more sensors that are respectively configured to sense information regarding a surrounding environment of the mobile computing apparatus 100. As a non-limiting example, the sensor 130 may include a forward facing sensor that senses or captures information regarding a forward region of the mobile computing apparatus. As non-limiting examples, the sensor 130 may include at least one of one or more GPS sensors, one or more Lidar sensors, one or more depth sensors, one or more cameras, one or more odometers.

The processor (i.e., one or more processors) 140 may be configured to control and manages overall operations of the mobile computing apparatus 100, as well as any or any combination of the communication device 110, the storage device 120, the sensor(s) 130, and navigation device 160. As non-limiting examples, the processor and may include at least one of one or more CPUs, one or more GPUs, one or more MCUs, one or more SoCs, or one or more application processors (APs). The processor 140 may be configured to execute computer (e.g., processor) executable (and/or readable) instructions.

The storage device (i.e., one or more storage devices) 120 may be configured to respectively temporarily or permanently store data with respect to any combination of operations the mobile computing apparatus is configured to perform. In an example, the storage device 120 may store a topology map, which may be downloaded through the communication device 110. The storage device(s) 120 may include non-volatile and/or volatile storage mediums, and/or non-volatile and/or volatile memories.

Moreover, the storage device 120 may store the computer (e.g., processor) executable instructions, which when executed by the processor 140 configures the processor 140 to perform any one, any combination, or all operations described herein with respect to FIGS. 1-17. As non-limiting examples, the instructions may include instructions that, when implemented by the processor 140, configure the processor to perform coordinate system conversions, such as a coordinate conversion according to Equation 1, as a non-limiting example, object segmentations, occupancy grid map generations, waypoint projections and generations of sub-waypoints, etc.

Accordingly, as a non-limiting example, the processor 140 may be configured to perform path generation operations 150, which may include global path generation 151, coordinate conversion 155, map generation 153, waypoint projection 157, and local path generation 159 operations.

The global path generation operation 151 may include the generation of local paths by using a respective topology map, e.g., stored in the storage device 120, and a real-time generated occupancy grid map.

As a non-limiting example, the global path generation operation 151 may include the performance of operations S121, S123, and S125 of FIG. 7, to generate the global path in the topology map.

The map generation operation 153 may include the generation of real-time occupancy grid maps representing drivable areas and un-drivable areas (an area to which a mobile computing apparatus does not yet move) by grid units by using sensor data input from the front sensing sensor 130.

The coordinate conversion operation 155 may include the conversion of coordinate values in a global coordinate system, e.g., of the topology map or corresponding GPS coordinates, into coordinate values in a coordinate system of the mobile computing apparatus. The coordinate values being converted may include those of nodes (waypoints) selected as waypoints for a traveling of the mobile computing apparatus according to the global path. As a non-limiting example, the coordinate conversion may be performed based on Equation 1. Thus, the coordinate conversion operation 155 may map the global path, generated in or based on the topology map, to the occupancy grid map.

For a next waypoint (e.g., WP2 of FIG. 10) with respect to a current waypoint (e.g., WP1 of FIG. 10) representing a current position of the mobile computing apparatus 100 among waypoints included in the global path mapped to the occupancy grid map that is located in the un-drivable area (e.g., un-drivable area 82 of FIG. 10), the waypoint projection operation 157 may include the generation of a sub-waypoint (e.g., SWP of FIG. 12) corresponding to the next waypoint through a projection of the next waypoint into the drivable area (e.g., drivable area 81 of FIG. 10).

While examples are not limited thereto, the generation of the sub-waypoint may be performed according to any or any combination of the descriptions of FIGS. 1 to 16.

As a non-limiting example, the waypoint projection operation 157 may project the next waypoint into the drivable area along a straight line (e.g., the straight line 10 of FIG. 11) connecting the current waypoint with the next waypoint to generate the sub-waypoint (e.g., CWP2 of FIG. 10 or SWP of FIG. 12), corresponding to the next waypoint (e.g., WP2 of FIG. 11), in the drivable area.

In an embodiment, the sub-waypoint generated in the drivable area may be a waypoint that is determined to be located farthest away from the current waypoint in the straight line.

As a non-limiting example, when a distance (e.g., distance d of FIG. 11) between the current waypoint (e.g., WP1 of FIG. 11) and the sub-waypoint (e.g., CWP2 of FIG. 11 or SWP of FIG. 12) is less than a reference distance value, the waypoint projection operation 157 may include a rotation of the straight line with respect to the current waypoint, and a projection of the next waypoint into the drivable area 81 along the rotated straight line (e.g., rotated line 10' of FIG.

15) to generate another sub-waypoint (e.g., CWP2', corresponding to the next waypoint WP2, in the drivable area 81).

As a non-limiting example, when a distance between the current waypoint and the other sub-waypoint along the rotated straight line is greater than or equal to the reference distance value, the waypoint projection module 157 may generate the other sub-waypoint as a final sub-waypoint, representing the next autonomous travel destination of the mobile computing apparatus.

The local path generation operation 159 may include the generation of a local path which includes the generated sub-waypoint, e.g., as generated in the occupancy grid map, such as may be performed in the sub-waypoint generation operation 157, the current waypoint of a mobile computing apparatus, and an edge that is determined to connect the generated sub-waypoint with the current waypoint.

The path generation operations 150 may be performed by the processor 140. The illustrated path generation operations 150 are also representative of one or more other processors of the mobile computing apparatus 100.

For example, each of the global path generation 151, coordinate conversion 155, map generation 153, waypoint projection 157, and local path generation 159 operations may also be representative of separate processing modules, e.g., each including one or more processors or the one or more processors and one or more memories that may store instructions to respectively configure a corresponding one or more processors to perform the corresponding global path generation 151, coordinate conversion 155, map generation 153, waypoint projection 157, and local path generation 159 operations. The path generation operations 150 may also be representative of any combination of one or more respective processing modules (e.g., each including one or more processors or the one or more processors and one or more memories that may store instructions to configure the one or more processors to perform the corresponding operations thereof).

The navigation device 160 may control and/or implement autonomous (as a non-limiting example) traveling of the mobile computing apparatus 100 along a local path generated by the local path generating module 157. For example, the navigation device 160 is representative of a controller which controls driving and movement of the mobile computing apparatus 100 and is representative of a movement driver system which is configured to drive/move the mobile robot through the local environment, e.g., based on control by the controller. The movement driver system may include, for example, a left wheel driving motor and a right wheel driving motor. The controller may control a rotation of each of the left wheel driving motor and the right wheel driving motor so that the mobile computing apparatus travels/moves through the local path. As non-limiting examples, the movement driver system may be configured to drive/move the mobile computing apparatus in various directions such as forward driving in a forward direction, rearward driving in a rearward direction, left rotation of the left wheel driving motor and/or the right wheel driving motor, and right rotation of the right wheel driving motor and/or the right wheel driving motor.

As a non-limiting example, the communication device 110, the storage device 120, the sensor 130, and the processor 140, as well as any processor modules configured to perform any of the path generation operations 150 may be integrated into one path generation computing device, e.g., separate from the navigation device 160, in mobile computing apparatus 100.

According to one or more embodiments, a topology map may be used, e.g., without a generating of a (or without use of such a generated) previously generated occupancy grid map, to generate a local map for autonomous navigation a mobile computing apparatus. Thus, in various embodiments, previous techniques for generating an occupancy grid map at a site by a worker operating the mobile robot moved at the site may not be needed or performed. Also, when a topology map which is small in data capacity is used in various embodiments, it may be easier to maintain and manage previously generated occupancy grid maps than the previous technique-generated occupancy grid maps.

Moreover, as a non-limiting example, a local path may be generated according to various embodiments by using a real-time generated occupancy grid map and a topology map, and thus, a mobile computing apparatus according to various embodiments may perform autonomous navigation in a zone to which the mobile computing apparatus has not yet traveled previously even though the topology map may be low in accuracy.

The processors, memories, storage devices, communication devices or systems, mobile devices, mobile robots, mobile computing devices, external computing devices, sensors, navigation devices, controllers, movement driver system, wheel driving motors, etc., described herein, including descriptions with respect to respect to FIGS. 1-17, are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in, and discussed with respect to, FIGS. 1-17 that perform the operations described in this application are performed by computing hardware, for example, by one or more processors or computers, implemented as described above implementing instructions (e.g., computer or processor/processing device readable instructions) or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method of a mobile computing apparatus, the method comprising:

generating a global path connecting a current position of the mobile computing apparatus with a future destination of the mobile computing apparatus based on a topology map that is generated based on mapping information;

generating, in real time, an occupancy grid map based on sensor data obtained from a sensor of the mobile computing apparatus, the occupancy grid map representing an un-drivable area and a drivable area in a surrounding environment of the mobile computing apparatus;

mapping the global path to the occupancy grid map;

generating a sub-waypoint located in the drivable area in response to a next waypoint, to which the mobile computing apparatus is set to travel based on the global path, being determined to correspond to the un-drivable area, where the next waypoint is among a plurality of waypoints included in the global path; and generating a local path, for a traveling of the mobile computing apparatus, connecting the current position with the sub-waypoint.

2. The method of claim 1, further comprising:

downloading the mapping information from a device that is external of the mobile computing apparatus;

determining nodes corresponding to the plurality of waypoints and edges connecting the nodes with one another from the mapping information; and generating the topology map based on the nodes and the edges.

3. The method of claim 1, wherein the generating of the global path comprises:

selecting nodes, from among a plurality of nodes of the topology map, connecting the current position of the mobile computing apparatus with the destination of the mobile computing apparatus;

setting the selected nodes to be the plurality of waypoints; and generating the global path including the plurality of waypoints and edges connecting the plurality of waypoints.

4. The method of claim 1, wherein the mapping of the global path to the occupancy grid map comprises converting coordinate values of a plurality of nodes of the global path into coordinate values in a coordinate system of the mobile computing apparatus.

5. The method of claim 1, wherein the generating of the sub-waypoint comprises:

generating a straight line connecting a current waypoint, representing the current position of the mobile computing apparatus, with the next waypoint in the occupancy grid map; and determining, as the sub-waypoint, a candidate waypoint determined to be located farthest away from the current waypoint in the drivable area from among a plurality of candidate waypoints along the straight line.

6. The method of claim 1, wherein the generating of the sub-waypoint comprises:

generating a straight line connecting a current waypoint, representing the current position of the mobile computing apparatus, with the next waypoint in the occupancy grid map;

selecting, from among a plurality of first candidate waypoints located along the straight line, a first candidate waypoint determined to be located farthest away from the current waypoint in the drivable area; and in response to a determined distance between the current waypoint and the first candidate waypoint being determined to be less than a reference distance:

rotating the straight line with respect to the current waypoint;

selecting, from among a plurality of second candidate waypoints located along the rotated straight line, a second candidate waypoint determined to be located farthest away from the current waypoint in the drivable area; and in response to a distance value between the current waypoint and the second candidate waypoint being determined to be greater than or equal to the reference distance value, determine the second candidate waypoint to be the sub-waypoint.

7. A mobile computing apparatus, comprising:

one or more processors configured to:

map a set global path, which connects a current position of the mobile computing apparatus with a future destination of the mobile computing apparatus based on a topology map, to a real-time generated occupancy grid map that represents, based on sensor data of a surrounding environment of the mobile computing apparatus, an un-drivable area and a drivable area in the surrounding environment; and generate a local path, for a traveling of the mobile computing apparatus, connecting the current position with a sub-waypoint that corresponds to the drivable area in response to a next waypoint, to which the mobile computing apparatus is set to travel based on the global path, being determined to correspond to the un-drivable area.

8. The apparatus of claim 7, wherein the topology map is based on mapping information generated external of the mobile computing apparatus, and wherein the one or more processors are further configured to generate in real-time, with respect to the mobile computing apparatus being at the current position, the occupancy grid map representing the un-drivable area and the drivable area based on the sensor data that is obtained from a sensor of the mobile computing apparatus.

9. The apparatus of claim 7, wherein the one or more processors are configured to generate the global path, including the one or more processors being configured to:

select, from among a plurality of nodes in the topology map, nodes connecting the current position with the future destination as waypoints of the mobile computing apparatus; and generate the global path including the waypoints and edges of the topology map that connect the waypoints with one another.

10. The apparatus of claim 9, wherein the mobile computing apparatus is a mobile robot that further comprises a driving motor, and wherein the one or more processors are further configured to cause the traveling of the mobile computing apparatus according to the generated local path.

11. The apparatus of claim 10, wherein the one or more processors are further configured to generate the topology map based on mapping information generated external of the mobile computing apparatus.

12. The apparatus of claim 7, further comprising a communication device, wherein the one or more processors are further configured to:

download mapping information, from a device that is external of the mobile computing apparatus, using the communication device;

determine nodes corresponding to a plurality of waypoints and edges connecting the nodes with one another from the mapping information; and generate the topology map based on the nodes and edges.

13. The apparatus of claim 7, wherein the one or more processors are configured to generate the sub-waypoint located in the drivable area, including the one or more processors being configured to:

determine, in the occupancy grid map, a straight line connecting a current waypoint, representing the current position of the mobile computing apparatus, with the next waypoint; and project the next waypoint into the drivable area based on the straight line.

14. The apparatus of claim 13, wherein, for the projection of the next waypoint, the one or more processors are configured to select the sub-waypoint, from among a plurality of candidate waypoints in the drivable area that are determined based on the straight line, that is determined to be located farthest away from the current waypoint among the plurality of candidate waypoints.

15. The apparatus of claim 13, wherein, for the projection of the next waypoint, the one or more processors are configured to:

determine a first candidate waypoint that is located in the drivable area farthest away, along the straight line, from the current waypoint; and in response to a determined distance between the current waypoint and the first candidate waypoint being determined to be less than a reference distance:

rotate the straight line;

select, from among a plurality of second candidate waypoints in the drivable area that are determined based on the rotated straight line, a second candidate waypoint determined to be located farthest away from the current waypoint in the drivable area; and determine the sub-waypoint dependent on the second candidate waypoint.

16. The apparatus of claim 15, wherein, for the determining of the sub-waypoint dependent on the second candidate waypoint, the one or more processors are configured to, in response to a determined distance value between the current waypoint and the second candidate waypoint being greater than or equal to the reference distance value, determine the sub-waypoint to be the second candidate waypoint.

17. A processor-implemented method of a mobile computing apparatus, the method comprising:

mapping a set global path, which connects a current position of the mobile computing apparatus with a future destination of the mobile computing apparatus based on a topology map, to a real-time generated occupancy grid map that represents, based on sensor data of a surrounding environment of the mobile computing apparatus, an un-drivable area and a drivable area in the surrounding environment; and generating a local path, for a traveling of the mobile computing apparatus, connecting the current position with a sub-waypoint that corresponds to the drivable area in response to a next waypoint, to which the mobile computing apparatus is set to travel based on the global path, being determined to correspond to the un-drivable area, wherein the topology map is based on mapping information generated external of the mobile computing apparatus.

18. The method of claim 17, further comprising generating in real-time, with respect to the mobile computing apparatus being at the current position, the occupancy grid map representing the un-drivable area and the drivable area based on the sensor data that is obtained from a sensor of the mobile computing apparatus.

19. The method of claim 17, further comprising:

downloading the mapping information from a device external of the mobile computing apparatus;

determining nodes corresponding to a plurality of waypoints and edges connecting the nodes with one another from the mapping information;

generating the topology map based on the nodes and edges.

20. The method of claim 17, further comprising generating the sub-waypoint located in the drivable area, comprising:

determining, in the occupancy grid map, a straight line connecting a current waypoint, representing the current position of the mobile computing apparatus, with the next waypoint;

selecting a first candidate waypoint determined to be located farthest away from the current waypoint in the drivable area from among a plurality of candidate waypoints determined along the straight line; and in response to a determined distance between the current waypoint and the first candidate waypoint being less than a reference distance:

rotating the straight line with respect to the current waypoint;

selecting a second candidate waypoint determined to be located farthest away from the current waypoint in the drivable area from among a plurality of candidate waypoints determined along the rotated straight line; and in response to a determined distance between the current waypoint and the second candidate waypoint being greater than or equal to the reference distance value, determining the sub-waypoint to be the second candidate waypoint.

* * * * *